Jan. 31, 1928.　　　　　H. Y. NORWOOD　　　　　1,657,805
MEASURING INSTRUMENT
Filed June 14, 1922
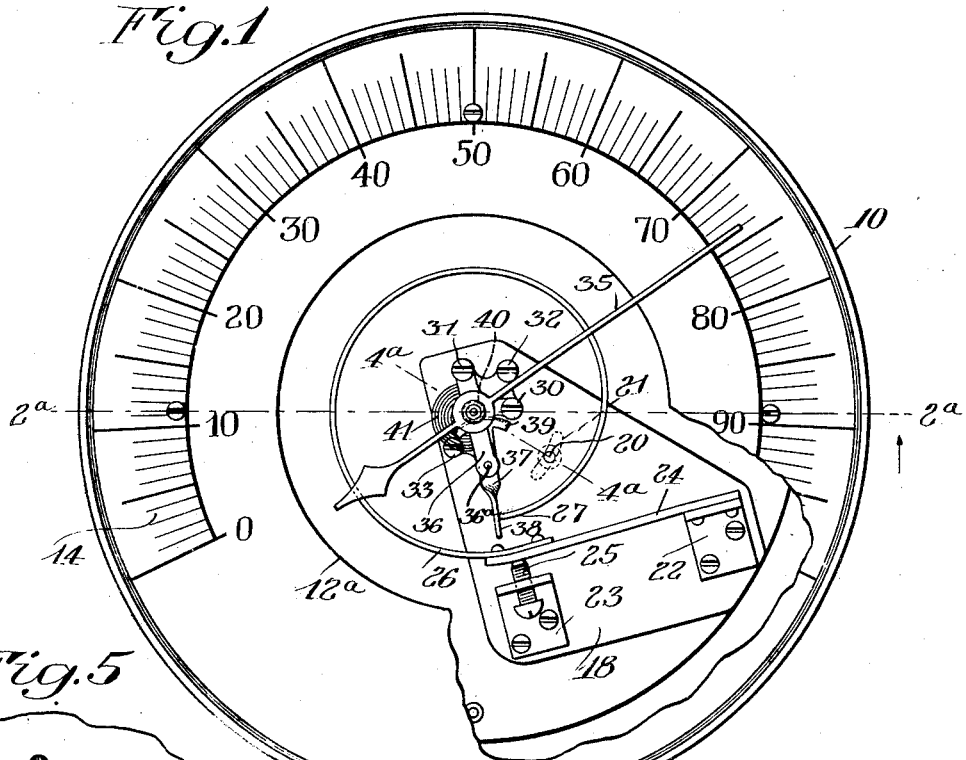
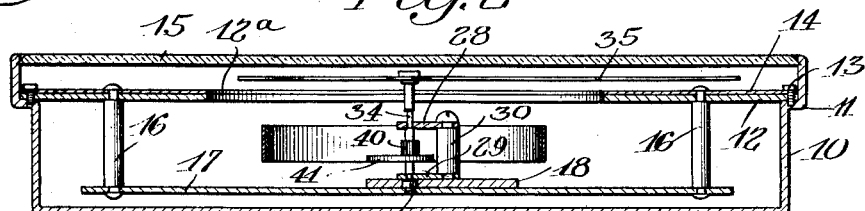
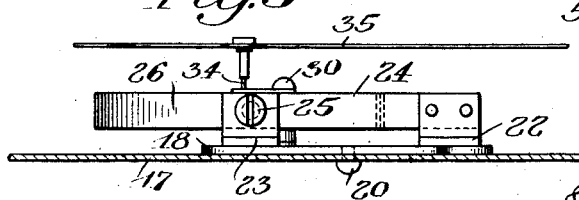
INVENTOR.
Harry Y. Norwood
BY
Frederick ................
his ATTORNEY Patented Jan. 31, 1928.

1,657,805

UNITED STATES PATENT OFFICE.

HARRY Y. NORWOOD, OF ROCHESTER, NEW YORK, ASSIGNOR TO TAYLOR INSTRUMENT COMPANIES, OF ROCHESTER, NEW YORK, A CORPORATION OF NEW YORK.

MEASURING INSTRUMENT.

Application filed June 14, 1922. Serial No. 568,265.

This invention relates to measuring instruments of the variety, for example, employed for measuring temperature or pressure conditions, having an index or similar part actuated by a sensitive element responsive to the condition to be measured, the chief object of the invention being to provide a simple and practical instrument of the above character comprising but few parts which may be economically manufactured and assembled. More specifically stated, it is an object of the invention to provide an efficient instrument of this description comprising advantageous mechanism for supporting and connecting the sensitive element with the index or other parts actuated thereby which is capable of being readily adjusted in a simple manner to correct the operation thereof for accuracy as may be required from time to time. To these and other ends the invention resides in certain improvements and combinations of parts all as will hereinafter be more fully described, the novel features being pointed out in the claims at the end of the specification.

In the drawings:

Figure 1 is a face view of a measuring instrument embodying the present invention, partly broken away to disclose the operating parts;

Figure 2 is a sectional view on the line 2ª—2ª of Figure 1;

Figure 3 is an elevation of the operating mechanism with the casing broken away;

Figure 4 is an enlarged detailed sectional view on the line 4ª—4ª of Figure 1;

Figure 5 is a sectional view on the line 5ª—5ª of Figure 4.

Similar reference numerals throughout the several views indicate the same parts.

The invention is embodied in the present instance, by way of illustration, in a measuring instrument of the temperature indicating variety having a metallic sensitive element or coil for actuating a pivoted index cooperating with a dial or scale marked in degrees of temperature, although, as will be readily apparent, the invention is capable of various other applications.

Referring more particularly to the drawings, there is shown at 10 a substantially cylindrical casing open at the front side and having the circular walls thereof offset outwardly as at 11 to provide a supporting shoulder for a dial plate 12 secured to the casing in any suitable manner as by means of screws 13. Secured to plate 12 about a central opening 12ª therein is an annular dial or scale 14 marked in degrees of temperature. The circular casing walls are extended forwardly of the dial and provided with a crystal 15, which closes the casing front.

Fixed to the dial plate 12 and extending rearwardly thereof are spacing and supporting posts 16 carrying at their other ends adjacent the back wall of the casing a plate 17 on which the operating mechanism is mounted.

The operating mechanism comprises, preferably, a substantially triangular plate-like frame 18 lying against the plate 17 and pivotally connected therewith as by means of a stud 19 fixed in plate 17 and on which frame 18 is pivotally carried at one of its corners. The stud or pivot 19 is located substantially at the center of the instrument and its dial for a purpose which will presently appear, and the frame is provided with means for securing it in a desired position of pivotal adjustment comprising, preferably, a screw 20 carried by the frame and projecting through a slot 21 in plate 17, by means of which screw the frame may be released for adjustment and then clamped in position. Fixed on frame 18 are spaced angular brackets 22 and 23 having legs extending forwardly from the frame. Bracket 22 has fixed thereto one end of a resilient arm 24, the other end of which extends adjacent bracket 23 in contact with an adjusting screw 25 carried in a threaded opening in the latter. To this end of arm 24 is fixed the outer end of a sensitive element in the form of a coil 26, which, in the present instance, is of the bimetallic sensitive variety responsive to temperature changes, as well understood in the art, although, of course, other forms of sensitive elements might be employed, such, for example, a Bourden tube where it is desired to measure variations in pressure. The other or movable end 27 of the coil is arranged to actuate the index mechanism which will now be described.

The index and its associated parts are, preferably, assembled as a complete unit and secured to frame 18. This unit comprises in the present instance a pair of plates 28 and 29 secured together in spaced relation by means of posts 30 and 31. Plate 29 is fixed to frame 18 as by means of screws 32 and 33 and in these plates is journalled for pivotal movement a spindle 34, the outer end of which projects through the central opening in the dial plate and carries the index or pointer 35 cooperating with the dial. It is to be noted that the spindle is located concentrically with the pivot or stud 19 about which frame 18 is pivotally adjusted, for a purpose which will more fully appear hereafter. Plates 28 and 29 are provided with arms 36 between which is pivotally supported lever 37 having a portion or surface 38 extended radially from the pivot and provided at its opposite end with a sector 39 formed with gear teeth meshing with a pinion 40 fixed on the spindle of the index for actuating the latter. A light spring 41 of the usual variety is attached to the spindle and to a stationary part of the mechanism for rotating the index normally toward zero position and through the connections described maintaining portion 38 of lever 37 in contact with the free end 27 of the sensitive element or coil. It is apparent that as the latter is extended and retracted by temperature variations, it swings lever 37 about its pivot and, through the multiplying gearing connection described, swings the index over the dial or scale to effect an indication corresponding to the temperature at any given time.

It has been found desirable in instruments of this variety to provide for the adjustment of the relative position of the dial and index, both as to locus and amplitude of movement to compensate for variations in the positions and conditions of the operating parts as may be necessary from time to time in order that the accuracy of the instrument may be maintained. The present invention provides a simple and advantageous means for readily accomplishing such adjustments either in the initial assembly or subsequent operation of the instrument. In order to adjust the locus of movement of the index to correct the position of the same relative to the dial at any given time to accurately indicate the corresponding temperature, it is merely necessary to loosen the screw 20, carried by frame 18 and swing the latter about its pivot 19. As this frame carries the index and its associated parts the latter are thereby swung bodily relative to the dial in the direction and to the extent necessary to correct the position of the index, after which frame 18 may again be fixed in position.

The amplitude of movement of the index for any given change in temperature may be corrected from time to time for purposes of accuracy by a correspondingly simple adjustment which merely involves adjustment of screw 25 on frame 18 to thereby adjust the position of coil 26 and its free end 27 toward and from the pivot 36ª of lever 37. The outer end 38 of the lever as shown in the drawings is formed with a flattened surface in opposing contact with the end of the coil which thus slides in engagement with the lever toward and from its pivot during such adjustments. It is apparent that as the coil end 27 is moved toward the pivot of the lever, the amplitude of movement of the index for a given expansion of the coil is increased, and vice versa. The above described adjustments of both the locus and amplitude of movement of the index are thus accomplished in a very simple manner by turning screw 20 and swinging plate 18, and by turning the screw 25, respectively. If desired the circumferential walls of the instrument may be provided with openings affording access to these adjusting parts without removing any parts of the instrument.

It is apparent from the above description and the drawings that the entire operating mechanism may be assembled as a unit on frame 18 which latter is associated in a simple manner with the casing. Furthermore the index mechanism proper carried by plates 28 and 29 may be assembled as a sub-unit and secured in place on frame 18 by a simple operation. This construction and arrangement of parts facilitates economy and accuracy in assembly. The parts are comparatively few in number and of a desirable character and so arranged and connected as to operate in a thoroughly reliable manner.

I claim as my invention:

1. In a measuring instrument of the character described, the combination with a member mounted for angular movement and a sensitive element responsive to conditions to be measured, for co-operation with the said member, of means connected to one end of the sensitive element for supporting the latter for angular movement relatively to said member and means for affording movement of said end in a radial direction relatively to said member.

2. In a measuring instrument of the character described, the combination with a pivotally mounted index and a sensitive coil responsive to the conditions to be measured, having one end in co-operative relation to the index, means connected to the other end for supporting the coil for angular movement relatively to the center of motion of the index and means for acting upon said other end of the coil to move it in a radial direction relatively to the center of motion of the index.

3. In a measuring instrument of the character described, the combination with a pivotally mounted index and a sensitive coil responsive to the conditions to be measured, having one end in co-operative relation to the index, a flexible member connected to the other end for supporting the coil, a support for the flexible member, mounted for angular movement about the center of rotation of the index and means for acting upon the flexible member to move said other end of the coil radially relatively to the center of motion of the index.

4. In a measuring instrument the combination of a casing provided with a dial, a plate-like frame on the casing, an assembled mechanism secured to the frame comprising a pivoted index cooperating with the dial, said frame being mounted for pivotal movement concentric with the pivot of the index to adjust the locus of movement of the latter relative to the dial, and a sensitive coil responsive to the condition to be measured having one end supported on the frame and the other connected with the index to actuate the latter.

5. In a measuring instrument, the combination of a dial, a frame, and index pivotally carried by the frame, said frame being mounted for pivotal movement concentric with the pivot of the index to adjust the position of the latter relative to the dial, a sensitive element responsive to the condition to be measured having one end adjustably connected with said index to actuate the same, and means on the frame adjustably supporting said element adjacent its other end for varying the position of the element and the amplitude of movement transmitted to the index.

6. In a measuring instrument, the combination of a dial, a frame, an index pivotally carried by the frame, said frame being mounted for pivotal movement concentric with the pivot of the index to adjust the position of the latter relative to the dial, a member pivoted on the frame for actuating the index, a sensitive element responsive to the condition to be measured having one end arranged for actuating engagement with said members at different distances from the pivot, thereof, and means on the frame adjustably supporting said element adjacent its other end for adjusting said first end thereof toward and from the pivot of said member to vary the amplitude of movement transmitted thereto.

7. In a measuring instrument, the combination of a dial, a frame, an index pivotally carried by the frame, said frame being mounted for pivotal movement concentric with the pivot of the index to adjust the position of the latter relative to the dial, a lever pivoted on the frame and having a multiplying gearing connection with said index for actuating the latter, a sensitive coil, responsive to the condition to be measured having one end arranged for actuating engagement with said lever at different distances from the pivot thereof, and means on the frame adjustably supporting said coil adjacent its other end for adjusting said first end thereof toward and from the pivot of said lever to vary the amplitude of movement transmitted thereto.

HARRY Y. NORWOOD.